US007558035B2

(12) United States Patent
Liang

(10) Patent No.: US 7,558,035 B2
(45) Date of Patent: Jul. 7, 2009

(54) ANOMALY CONTROL DEVICE FOR A DUAL FAN OF COMPUTER

(75) Inventor: Chien-Fa Liang, Chung-Ho (TW)

(73) Assignee: Super Micro Computer, Inc., San Jose, CA (US)

( * ) Notice: Subject to any disclaimer, the term of this patent is extended or adjusted under 35 U.S.C. 154(b) by 357 days.

(21) Appl. No.: 11/501,012

(22) Filed: Aug. 9, 2006

(65) Prior Publication Data

US 2008/0037187 A1    Feb. 14, 2008

(51) Int. Cl.
*H02H 3/20* (2006.01)
(52) U.S. Cl. ..................................... 361/91.1
(58) Field of Classification Search ................. 361/91.1
See application file for complete search history.

(56) References Cited

U.S. PATENT DOCUMENTS

| 5,534,854 | A  | * | 7/1996  | Bradbury et al. ............ 340/648 |
| 5,914,858 | A  | * | 6/1999  | McKeen et al. ............. 361/695 |
| 6,188,189 | B1 | * | 2/2001  | Blake ......................... 318/471 |
| 7,301,784 | B2 | * | 11/2007 | Murakami et al. ........ 363/21.01 |

* cited by examiner

*Primary Examiner*—Stephen W Jackson
*Assistant Examiner*—Scott Bauer
(74) *Attorney, Agent, or Firm*—Troxell Law Office PLLC

(57) ABSTRACT

An anomaly control device for a dual fan of computer is composed of a first and second coil, a first and second driving IC, a controller, and a voltage level comparing circuit. The voltage level comparing circuit will perform a voltage dividing to a first and second reference potential signals input from the first and second driving ICs to obtain a third reference potential signal which is compared with a reference pulse wave signal output from an output end of the first driving IC, to determine to output either a high level pulse voltage signal or a low voltage direct-current signal to the controller for processing. The controller will output a control-gate-on or a control-gate-off signal to the first and second driving ICs for enabling the first and second coils to continue to operate or to stop operating.

10 Claims, 5 Drawing Sheets

ANOMALY CONTROL DEVICE FOR A DUAL FAN OF COMPUTER

BACKGROUND OF THE INVENTION (a) Field of the Invention

The present invention relates to an anomaly control device for a dual fan of computer, and more particularly to an anomaly control device by which a dual fan will immediately stop operating and a user will be notified through a warning signal shown by an indicator, as long as one of the fans has an abnormal rotation speed or is damaged, when the dual fan set is dissipating heat.

(b) Description of the Prior Art

It is known that a radiator constituted by a dual fan is installed in a computer to dissipate heat from components, such as chips and central processing units, on a computer motherboard. However, this radiator composed of the dual fan is provided with the following drawbacks under a long term of usage:

(1) A controller of computer can only identify an anomaly of rotation speed or a failure of one of the fans, and a user will not be aware and will think that the dual fan is still operating normally, when the other fan is abnormal or damaged, which will induce an insufficient heat dissipation, such that the components on the motherboard will be damaged due to being heated up.

(2) When the dual fan is operating, the user will not be aware of a change of operating speed (such as rounds-per-minute, or rpm) of at least one fan at all and thus will not be able to control the operating status of dual fan.

SUMMARY OF THE INVENTION

Accordingly, the primary object of present invention is to provide an anomaly control device for a dual fan of computer, whereby an operating status of the dual fan can be monitored at any time through an indicator, such that the dual fan will immediately stop operating and a user will be notified for repairing through warning texts sent out from the indicator, as long as one of the fans is operating abnormally or is damaged.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
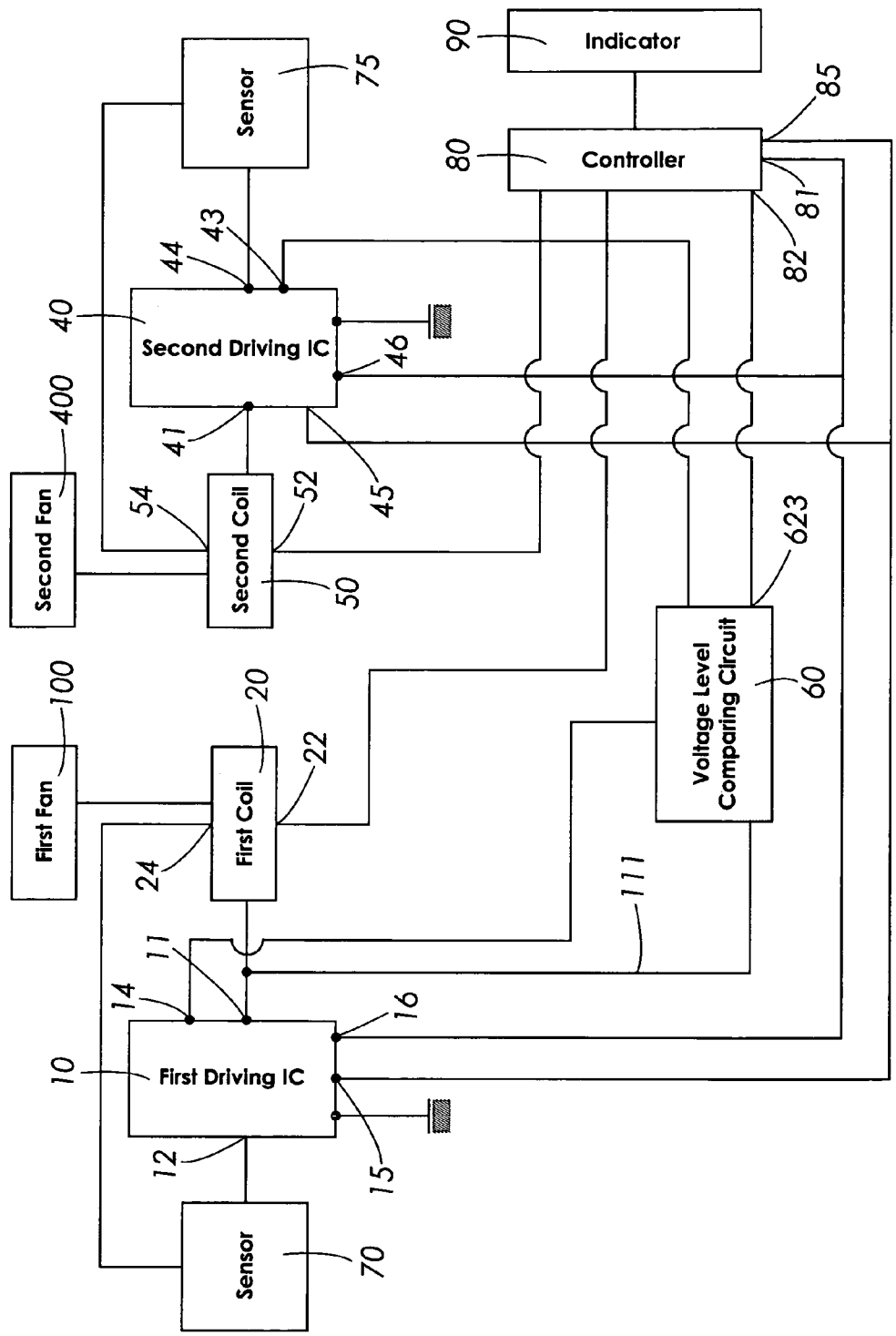
FIG. 1 shows a block diagram of a circuit of the present invention.

Referring to FIGS. 1 to 4, the present invention is to provide an anomaly control device for a dual fan of computer, which includes a first driving IC 10, a pulse-wave-signal output end 11 of which is connected to a first coil 20; a second driving IC 40, a pulse-wave-signal output end 41 of which is connected to a second coil 50, and voltage-signal output ends 14, 43 of the first and second driving ICs 10, 40 are connected to a voltage level comparing circuit 60, respectively; and a controller 80, output ends 81 of which, for controlling output or on/off of voltage signals, are connected to voltage signal input ends 16, 46 of the first and second driving ICs 10, 40, respectively. The pulse-wave-signal output end 11 of the first driving IC 10 is connected to the voltage level comparing circuit 60 through a shunt 111, and a signal output end 623 of the voltage level comparing circuit 60 is connected to an input end 82 of the controller 80. By performing a voltage dividing to a first and second reference potential signals 32, 33 input from the first and second driving ICs 10, 40, the voltage level comparing circuit 60 will generate a third reference potential signal 35 (as shown in FIG. 5) which will be compared with a reference pulse wave signal 30 output from the output end 11 of first driving IC 10 for determining to either output a high level pulse voltage signal 361 or output a low voltage direct-current signal 36 to the controller 80 for processing. When the voltage level comparing circuit 60 outputs the low voltage direct-current signal 36 to the controller 80, an output end 81 of controller 80 will output a control-gate-off signal 34 to the first and second driving ICs 10, 40 to deactivate the first and second coils 20, 50. However, when the voltage level comparing circuit 60 outputs the high level pulse voltage signal 361 to the controller 80, the output end 81 of controller 80 will output a control-gate-on signal 31 to the first and second driving ICs 10, 40, to activate the first and second coils 20, 50.

Figure 2:
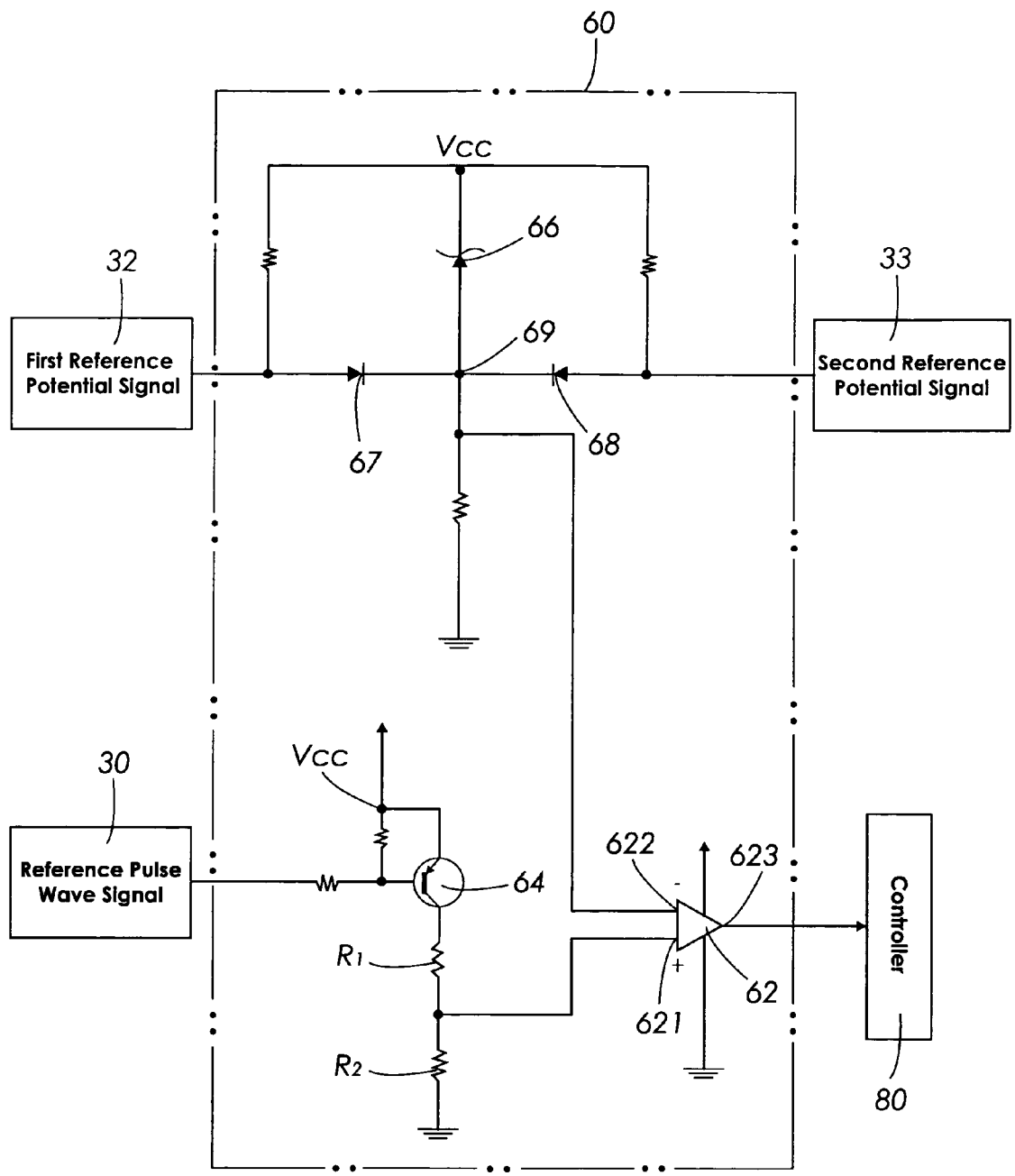
FIG. 2 shows a circuit diagram of a voltage level comparison of the present invention.

Accordingly, Referring to FIG. 1 and FIG. 2, the voltage level comparing circuit 60 is composed of a transistor 64, at least two diodes 67, 68, a Zener diode 66, and a comparator 62, wherein a signal input end of the transistor 64 is connected to the signal output end 11 of first driving IC 10; an output end of the transistor 64 is connected to a positive input end 621 of the comparator 62; a common connection end 69 of the two diodes 67, 68 and the Zener diode 66 is connected to a cathode input end 622 of the comparator 62; an output end 623 of the comparator 62 is connected to the controller 80; other connection ends of the two diodes 67, 68 are connected to the signal output ends 14, 43 of the first driving IC 10 and the second driving IC 40, respectively; and another connection end of the Zener diode 66 is connected to a positive source $V_{CC}$.

Accordingly, referring to FIG. 1, the first coil 20 is connected to a first fan 100, the second coil 50 is connected to a second fan 400, the first driving IC 10 is used to drive the first fan 100 to rotate, and the second driving IC 40 is used to drive the second fan 400 to rotate.

Accordingly, a signal output end 24 of the first coil 20 is provided with a sensor 70 which is connected to a signal input end 12 of the first driving IC 10, and a signal output end 54 of the second coil 50 is provided with a sensor 75 which is connected to a signal input end 44 of the second driving IC 40.

Accordingly, referring to FIG. 1 and FIG. 2, the reference pulse wave signal 30 output from the controller 80 is transmitted into signal input ends 15, 45 of the first and second driving ICs 10, 40, through a signal output end 85 of the controller 80.

Accordingly, signal output ends 22, 52 of the first and second driving ICs 20, 50 are connected to the controller 80, and real-time operating data of the first and second coils 20, 50 can be input to the controller 80 for processing.

Accordingly, referring to FIG. 1, the controller 80 is connected to an indicator 90, such that signals of operating conditions of the first and second driving ICs 10, 40, as well as of the first and second coils 20, 50 can be displayed on the indicator with texts.

Accordingly, referring to FIG. 2 and FIG. 5, the third reference potential signal 35 is output to the cathode input end 622 of comparator 62, and the reference pulse wave signal 30 is buffer-amplified by the transistor 64 and is processed with a voltage dividing by resistors R1, R2 which are serially connected to the transistor 64. The reference pulse wave signal 30 after being processed with the voltage dividing is input to the positive input end 621 of comparator 62 which will compare potentials of the positive and cathode input ends 621, 622, and will output the high level pulse voltage signal 361 or the low voltage direct-current signal 36 to the controller 80 from the output end 623.

Figure 3:
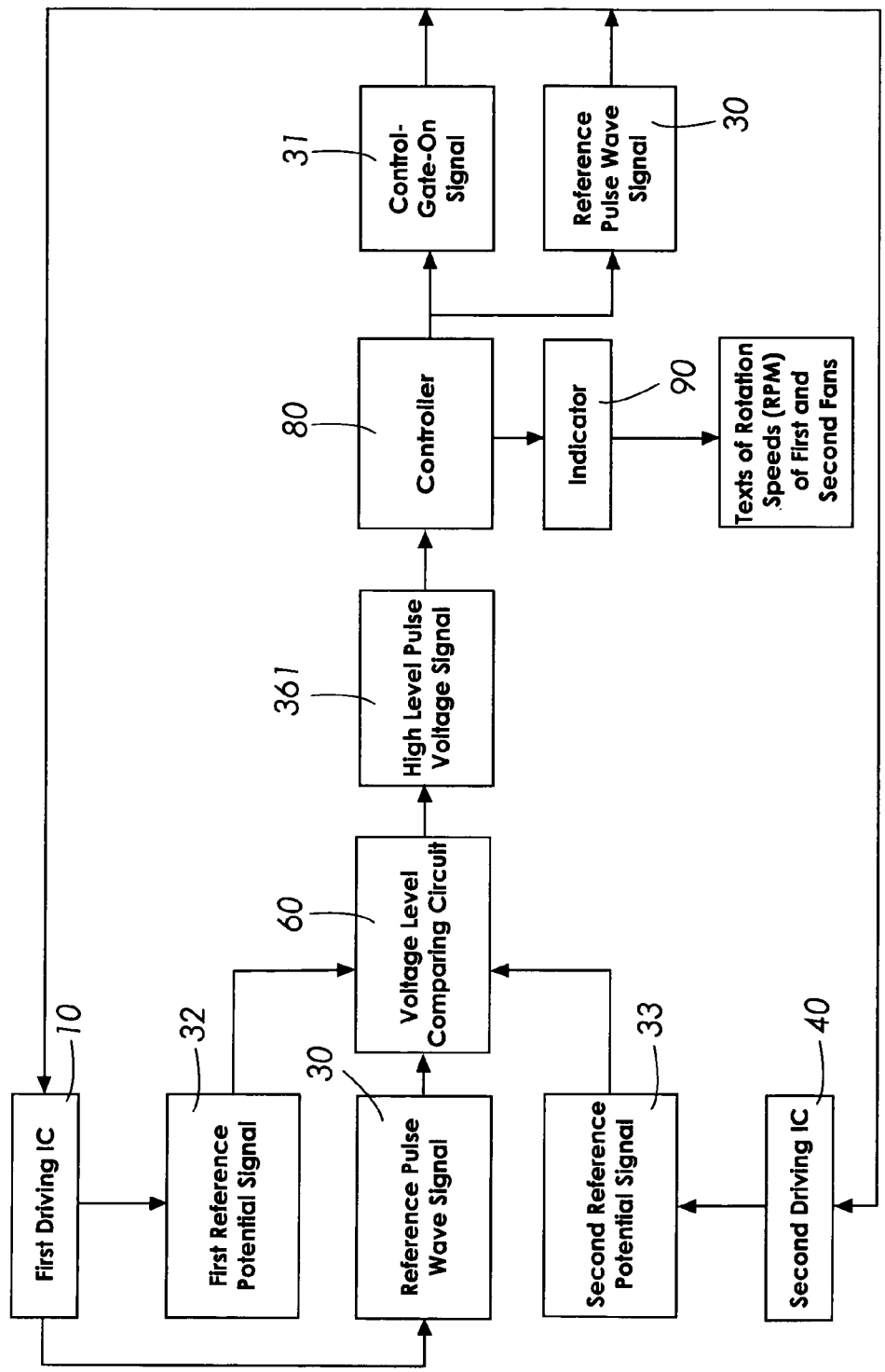
FIG. 3 shows a flow diagram of a normal function of dual fan of the present invention.

If a first and second fans 100, 400 are under a condition of normal operation:

Referring to FIG. 1 and FIG. 3, a controller 80, which is installed on a computer motherboard, is at least composed of well known electronic components including a logic IC circuit being written in with a program set, and central processing units. In addition, data of reference pulse wave signals 30 of rotation speeds of a first and second fans 100, 400 are written into the program set.

A control-gate-on signal 31 is output to a first driving IC 10 and a second driving IC 40, respectively, through an output end 81 of the controller 80, so as to enable the first and second driving ICs 10, 40 to operate normally. The configured data of reference pulse wave signals 30 of rotation speeds are output to the first and second driving ICs 10, 40 respectively for processing, through an output end 85 of the controller 80, and the reference pulse wave signals 30 of a fixed value are output to a first coil 20 and a voltage level comparing circuit 60 respectively, through an output end 11 of the first driving IC 10 and a shunt 111, wherein the reference pulse wave signal 30 is used to drive the first coil 20 at the same time. An electromagnetic effect generated from the first coil 20 is used to drive the first fan 100 to rotate at a specified speed. In addition, the second driving IC 40 also outputs a reference pulse wave signal 30 to a second coil 50 through an output end 41 to drive the second coil 50. An electromagnetic effect generated from the second coil 50 is used to drive the second fan 400 to rotate at a specified speed. Accordingly, the first and second fans 100, 400 installed on the computer motherboard can dissipate heat from components in the computer with the configured normal speeds.

Pulse wave signals generated during a real-time operation of the first and second coils 20, 50 are detected by sensors 70, 75, and are processed and converted into signals which can be processed by the first and second driving ICs 10, 40, to be fed into the first and second driving ICs 10, 40 for processing.

When the first and second fans 100, 400 are rotating in a specified range (rounds-per-minute, or rpm) of normal operation, the first driving IC 10 will output a first reference potential signal 32 to the voltage level comparing circuit 60 through an output end 14, the second driving IC 40 will output a second reference potential signal 33 to the voltage level comparing circuit 60 through an output end 43 (as shown in FIG. 3 and FIG. 5), and the reference pulse wave signal 30 output from the output end 11 of first driving IC 10 will be input to the voltage level comparing circuit 60 through the shunt 111. Referring to FIG. 2 and FIG. 5, the first and second reference potential signals 32, 33 are all voltage signals of Lo, which cannot be conducted in two diodes 67, 68; that is, the two diodes 67, 68 are in an off state. Therefore, a cathode input end 622 of a comparator 62 is input with a third reference potential signal 35 which is formed by a difference between a potential of Zener diode 66 and a potential of source $V_{CC}$. Assuming that the source $V_{CC}$ is at 12 V, and the potential of Zener diode 66 is at 9 V, then the third reference potential signal 35 is at 3 V. Furthermore, the reference pulse wave signal 30 output from the output end 11 of first driving IC 10 is buffer-amplified by a transistor 64, is processed with a voltage dividing by two resistors R1, R2, and is then input to a positive input end 621 of the comparator 62. The third reference potential signal 35 and a potential of reference pulse wave signal 30 are input to the positive and cathode input ends 621, 622 of the comparator 62 (as shown in FIG. 5), respectively, for a comparison of voltage levels, to output a high level pulse voltage signal 361 to the controller 80 for determination and processing. If the controller 80 determines that the pulse wave signal is the high level pulse voltage signal 361, it can still continuously provide the control-gate-on signal 31 to the first and second driving ICs 10, 40 to operate, and the first and second fans 100, 400 are still under a condition of normal operation. In other words, as shown in FIG. 2, when a potential of positive input end 621 is higher than that of the cathode input end 622, an output end 623 of the comparator 62 will output the high level pulse voltage signal 361 (Pulse Sensor) to the controller 80 for determination and processing. Therefore, the controller 80 will still output the control-gate-on signal 31 to the first and second driving ICs, enabling the first and second driving ICs 10, 40 to be under the condition of normal operation.

Figure 4:
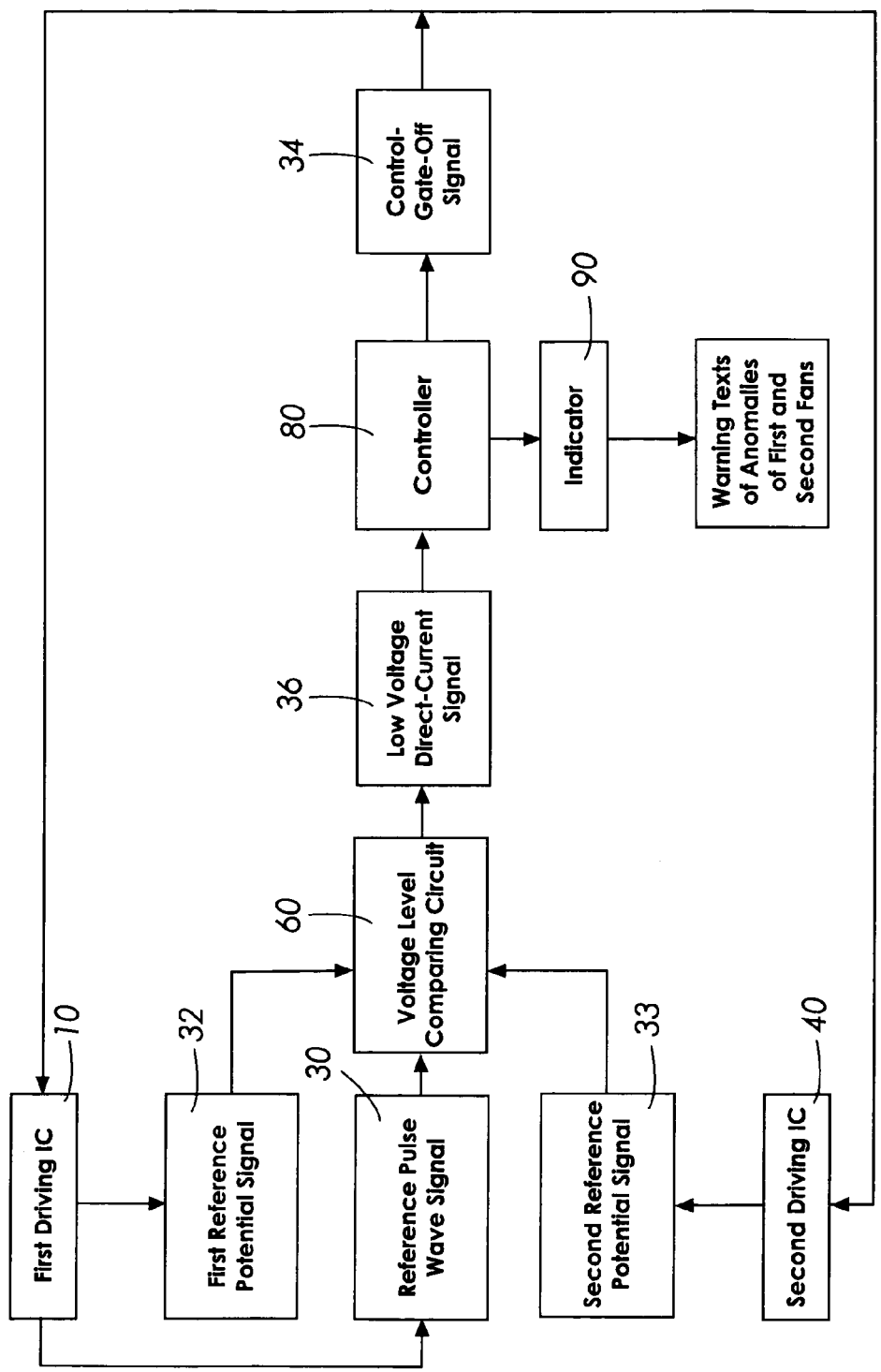
FIG. 4 shows a flow diagram of an abnormal function of dual fan of the present invention.
Figure 5:
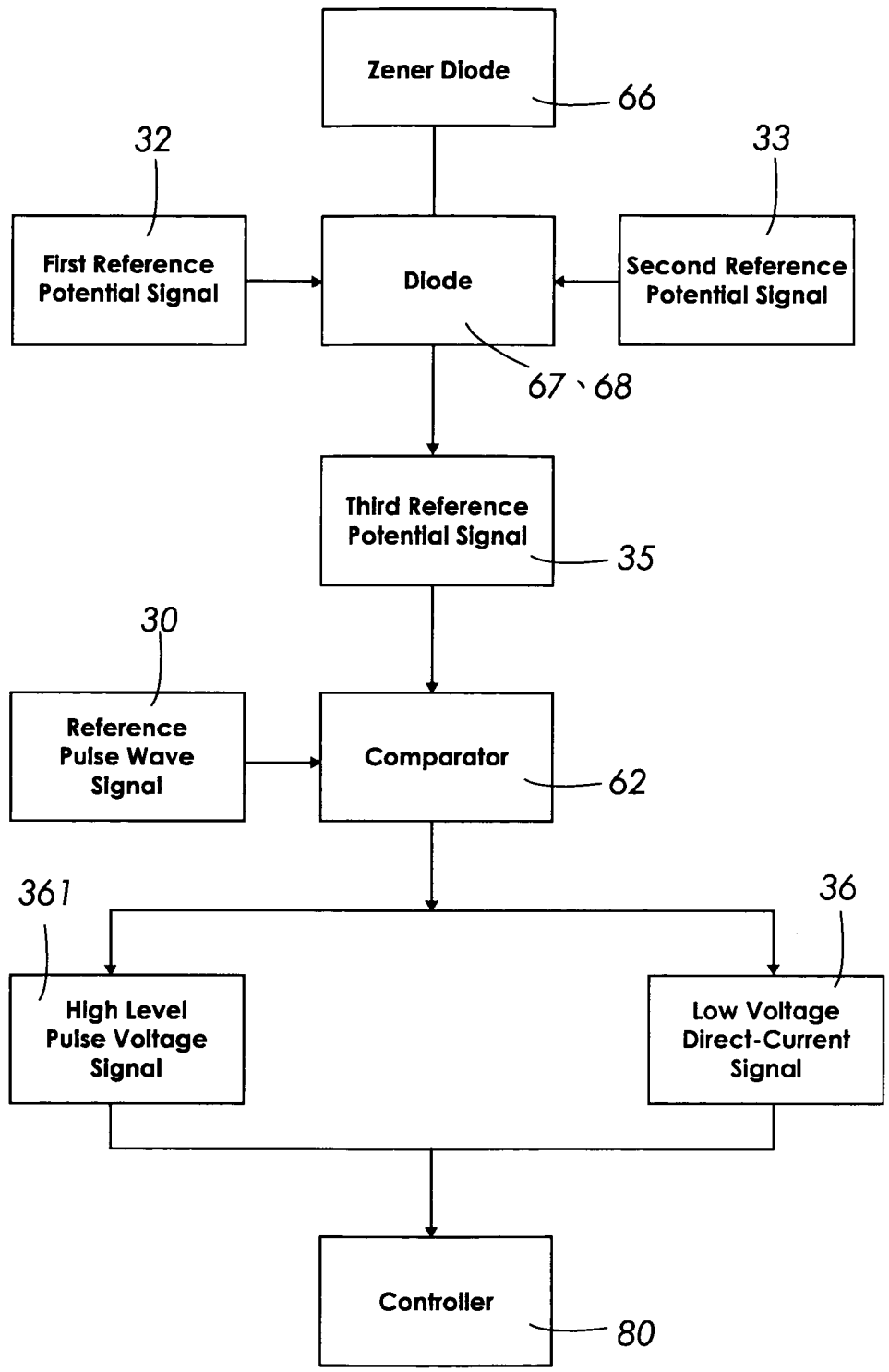
FIG. 5 shows another block diagram of a circuit of the present invention

If the first and second fans 100, 400 are rotating at abnormal speeds:

Referring to FIGS. 1, 2, and 4, when a rotation speed of first fan 100 or second fan 400 or both fans is defined to be too fast or too slow, a pulse wave signal output from a real-time operation of the first coil 20 or the second coil 50 is detected by a sensor 70 or another sensor 75 and converted to a signal which can be processed by the first or second driving IC 10, 40. After being fed back to the first or second driving IC 10, 40 and processed, the first and second reference potential signals 32, 33 are input to the voltage level comparing circuit 60 for processing, and the output end 14 of first driving IC 10 or the output end 43 of second driving IC 40 will output the first reference potential signal 32 or the second reference potential signal 33, which is already abnormal, respectively. At this time, as long as one diode 67 or another diode 68 receives a voltage signal of high level, Hi, of the first reference potential signal 32 or the second reference potential signal 33, the diode will be immediately conducted. Therefore, the third reference potential signal 35 is fed into the cathode input end 622 of the comparator 62. Assuming that a source $V_{CC}$ of loop constituted by the Zener diode 66 and the two diodes 67, 68 is at 12 V, and a potential of Zener diode 66 is 0 V, then the third reference potential signal 35, which will be input to the cathode input end 622, is at 12 V. As the reference pulse wave signal 30 is input to the positive input end 621 of comparator 62, the third reference potential signal 35 at the cathode input end 622 is compared with a potential of reference pulse wave signal 30 at the positive input end 621 by the comparator 62. If a potential value of cathode input end 622 is higher than that of positive input end 621, the output end 623 of comparator 62 will output the low voltage direct-current signal 36 (Lock Sensor) to the controller 80. After receiving the low voltage direct-current signal 36 output from the comparator 62, the controller 80 will output the control-gate-off signal 34 to the first and second driving ICs 10, 40 to deactivate the first and second driving ICs 10, 40, which will not drive the first and second coils 20, 50, thereby enabling the first and second fans 100, 400 to stay in a stop condition. Although only the first fan 100 or the second fan 400 of the two fans is damaged or abnormal, both of the first and second fans 100, 400 are stopped.

If the first and second fans 100, 400 are damaged without operating:

When the first or second fan 100, 400, or both of the fans is damaged and stopped, as shown in FIG. 1, as a sensor 70 or another sensor 75 does not detect a pulse signal of the first coil 20 or the second coil 50, it will be in an off state. As the first driving IC 10 or the second driving IC 40 does not receive the signal from the sensor 70 or 75, the first reference potential signal 32 or the second reference potential signal 33 output from the first driving IC 10 or the second driving IC 40 will both be a voltage signal of high level, Hi, and the diode 67 or 68 will be immediately conducted. The third reference potential signal 35 will be input to the cathode input end 622 of comparator 62, and the reference pulse wave signal 30 which is buffer-amplified by the transistor 64 and is processed with a voltage dividing by the resistors R1, R2 will be input to the positive input end 621. According to the aforementioned descriptions, if the potential of cathode input end 622 is higher than that of the positive input end 621, the output end 623 of comparator 62 will output the low voltage direct-current signal 36 (Lock Sensor) to the controller 80 which will output the control-gate-off signal 34 to the first and second driving ICs 10, 40 to stop operating; whereas the first and second fans 100, 400 will also stop operating.

Referring to FIG. 1, signals of operating data of electromagnetic effects from the first and second coils 20, 50 will be input to the controller 80 through two output ends 22, 52, respectively. The controller 80 will then display the processed signals on an indicator 90. As the signals are converted to rotation speeds (rpm) of the first and second fans 100, 400 for displaying, a user can monitor the operating speeds of first and second fans 100, 400 at any time through the indicator 90. According to the aforementioned descriptions, if the first and second coils 20, 50 are operating abnormally or stop operating, the controller 80 will immediately turn off the first and second driving ICs 10, 40, and in the mean time, will output a warning text on the indicator 90 or output a warning sound signal to be sent out from a speaker (not shown on the drawings). At this time, the rotation speeds (rpm) of the first and second fans 100, 400 displayed on the indicator 90 will be a stop condition at the same time when the first and second driving ICs 10, 40 are turned off. Accordingly, other than showing the warning texts, the indicator 90 can also display the final rotation speeds of the first and second fans 100, 400, which will facilitate a determination of which fan 100, 400 is abnormal or damaged.

Accordingly, in using the dual fan set to dissipate heat from computer components, the operating state of the dual fan set can be monitored at any time. In addition, as long as one of the fans is abnormal, both fans will be open-circuited, and which one is abnormal or damaged can be identified from the indicator. At the same time, the warning texts or sound can be issued to alert the user.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An anomaly control device for a dual fan of computer, comprising:
    a first driving IC, a pulse-wave-signal output end of which is connected to a first coil;
    a second driving IC, a pulse-wave-signal output end of which is connected to a second coil, and voltage-signal output ends of the first and second driving ICs are connected to a voltage level comparing circuit respectively; and
    a controller, output ends of which, for controlling output or on/off of voltage signals, are connected to voltage signal input ends of the first and second driving ICs respectively;
    the pulse-wave-signal output end of the first driving IC being connected to the voltage level comparing circuit through a shunt, and a signal output end of the voltage level comparing circuit being connected to an input end of the controller;
    the voltage level comparing circuit performing a voltage dividing to a first and second reference potential signals input from the first and second driving ICs to generate a third reference potential signal which is compared with a reference pulse wave signal output from the output end of first driving IC for determining to either output a high level pulse voltage signal or output a low voltage direct-current signal to the controller for processing; provided that the voltage level comparing circuit 60 outputting the low voltage direct-current signal to the controller, an output end of controller outputting a control-gate-off signal to the first and second driving ICs to deactivate the first and second coils;
    when the voltage level comparing circuit outputting the high level pulse voltage signal to the controller, the output end of controller outputting a control-gate-on signal to the first and second driving ICs, to activate the first and second coils,
    wherein the voltage level comparing circuit includes a transistor, at least two diodes, a Zener diode, and a comparator;
    a signal input end of the transistor being connected to the signal output end of first driving IC;
    an output end of the transistor being connected to a positive input end of the comparator;
    a common connection end of the two diodes and the Zener diode being connected to a cathode input end of the comparator;
    an output end of the comparator being connected to the controller;
    other connection ends of the two diodes being connected to the signal output ends of the first driving IC and the second driving IC, respectively; and
    another connection end of the Zener diode being connected to a positive source VCC.

2. The anomaly control device for a dual fan of computer according to claim 1, wherein the first coil is connected to the first fan, the second coil is connected to the second fan, the first driving IC is used to drive the first fan to rotate, and the second driving IC is used to drive the second fan to rotate.

3. The anomaly control device for a dual fan of computer according to claim 1, wherein a signal output end of the first coil is provided with a sensor to be connected to a signal input end of the first driving IC, and a signal output end of the second coil is provided with a sensor to be connected to a signal input end of the second driving IC.

4. The anomaly control device for a dual fan of computer according to claim 1, wherein the reference pulse wave signal output from the controller is transmitted into signal input ends of the first and second driving ICs, through a signal output end of the controller.

5. The anomaly control device for a dual fan of computer according to claim 1, wherein the signal output ends of the first and second driving ICs are connected to the controller, and real-time operating data of the first and second coils can be input to the controller for processing.

6. The anomaly control device for a dual fan of computer according to claim 1, wherein the controller is connected to an indicator, such that signals of operating conditions of the first and second driving ICs, as well as of the first and second coils can be displayed on the indicator with texts.

7. The anomaly control device for a dual fan of computer according to claim 1, wherein the third reference potential signal is output to the cathode input end of comparator, and the reference pulse wave signal is buffer-amplified by the transistor and is processed with a voltage dividing by resistors which are serially connected to the transistor, followed by being input to the positive input end of comparator which will compare potentials of the positive and cathode input ends, and will output the high level pulse voltage signal or the low voltage direct-current signal to the controller from the output end.

8. An anomaly control device for a dual fan of computer, comprising:
   a first driving IC, a pulse-wave-signal output end of which is connected to a first coil;
   a second driving IC, a pulse-wave-signal output end of which is connected to a second coil, and voltage-signal output ends of the first and second driving ICs are connected to a voltage level comparing circuit respectively; and
   a controller, output ends of which, for controlling output or on/off of voltage signals, are connected to voltage signal input ends of the first and second driving ICs respectively;
   the pulse-wave-signal output end of the first driving IC being connected to the voltage level comparing circuit through a shunt, and a signal output end of the voltage level comparing circuit being connected to an input end of the controller;
   the voltage level comparing circuit performing a voltage dividing to a first and second reference potential signals input from the first and second driving ICs to generate a third reference potential signal which is compared with a reference pulse wave signal output from the output end of first driving IC for determining to either output a high level pulse voltage signal or output a low voltage direct-current signal to the controller for processing; provided that the voltage level comparing circuit 60 outputting the low voltage direct-current signal to the controller, an output end of controller outputting a control-gate-off signal to the first and second driving ICs to deactivate the first and second coils;
   when the voltage level comparing circuit outputting the high level pulse voltage signal to the controller, the output end of controller outputting a control-gate-on signal to the first and second driving ICs, to activate the first and second coils,
   wherein a signal output end of the first coil is provided with a sensor to be connected to a signal input end of the first driving IC, and a signal output end of the second coil is provided with a sensor to be connected to a signal input end of the second driving IC.

9. An anomaly control device for a dual fan of computer, comprising:
   a first driving IC, a pulse-wave-signal output end of which is connected to a first coil;
   a second driving IC, a pulse-wave-signal output end of which is connected to a second coil, and voltage-signal output ends of the first and second driving ICs are connected to a voltage level comparing circuit respectively; and
   a controller, output ends of which, for controlling output or on/off of voltage signals, are connected to voltage signal input ends of the first and second driving ICs respectively;
   the pulse-wave-signal output end of the first driving IC being connected to the voltage level comparing circuit through a shunt, and a signal output end of the voltage level comparing circuit being connected to an input end of the controller;
   the voltage level comparing circuit performing a voltage dividing to a first and second reference potential signals input from the first and second driving ICs to generate a third reference potential signal which is compared with a reference pulse wave signal output from the output end of first driving IC for determining to either output a high level pulse voltage signal or output a low voltage direct-current signal to the controller for processing; provided that the voltage level comparing circuit 60 outputting the low voltage direct-current signal to the controller, an output end of controller outputting a control-gate-off signal to the first and second driving ICs to deactivate the first and second coils;
   when the voltage level comparing circuit outputting the high level pulse voltage signal to the controller, the output end of controller outputting a control-gate-on signal to the first and second driving ICs, to activate the first and second coils,
   wherein signal output ends of the first and second driving ICs are connected to the controller, and real-time operating data of the first and second coils can be input to the controller for processing.

10. An anomaly control device for a dual fan of computer, comprising:
   a first driving IC, a pulse-wave-signal output end of which is connected to a first coil;
   a second driving IC, a pulse-wave-signal output end of which is connected to a second coil, and voltage-signal output ends of the first and second driving ICs are connected to a voltage level comparing circuit respectively; and
   a controller, output ends of which, for controlling output or on/off of voltage signals, are connected to voltage signal input ends of the first and second driving ICs respectively;
   the pulse-wave-signal output end of the first driving IC being connected to the voltage level comparing circuit through a shunt, and a signal output end of the voltage level comparing circuit being connected to an input end of the controller;
   the voltage level comparing circuit performing a voltage dividing to a first and second reference potential signals input from the first and second driving ICs to generate a third reference potential signal which is compared with a reference pulse wave signal output from the output end of first driving IC for determining to either output a high level pulse voltage signal or output a low voltage direct-current signal to the controller for processing; provided that the voltage level comparing circuit 60 outputting the low voltage direct-current signal to the controller, an output end of controller outputting a control-gate-off signal to the first and second driving ICs to deactivate the first and second coils;
   when the voltage level comparing circuit outputting the high level pulse voltage signal to the controller, the output end of controller outputting a control-gate-on signal to the first and second driving ICs, to activate the first and second coils, wherein the third reference potential signal is output to the cathode input end of comparator, and the reference pulse wave signal is buffer-amplified by the transistor and is processed with a voltage dividing by resistors which are serially connected to the transistor, followed by being input to the positive input end of comparator which will compare potentials of the positive and cathode input ends, and will output the high level pulse voltage signal or the low voltage direct-current signal to the controller from the output end.

* * * * *